March 3, 1959　　　　E. G. HILL　　　　2,875,582
BOOSTER BRAKE MECHANISM
Filed Dec. 18, 1953　　　　　　　　　　5 Sheets-Sheet 1

INVENTOR
EDWARD GOVAN HILL
BY John F. Phillips
ATTORNEY

March 3, 1959  E. G. HILL  2,875,582
BOOSTER BRAKE MECHANISM
Filed Dec. 18, 1953  5 Sheets-Sheet 2

INVENTOR
EDWARD GOVAN HILL
BY John F. Phillips
ATTORNEY

March 3, 1959  E. G. HILL  2,875,582
BOOSTER BRAKE MECHANISM
Filed Dec. 18, 1953  5 Sheets-Sheet 3
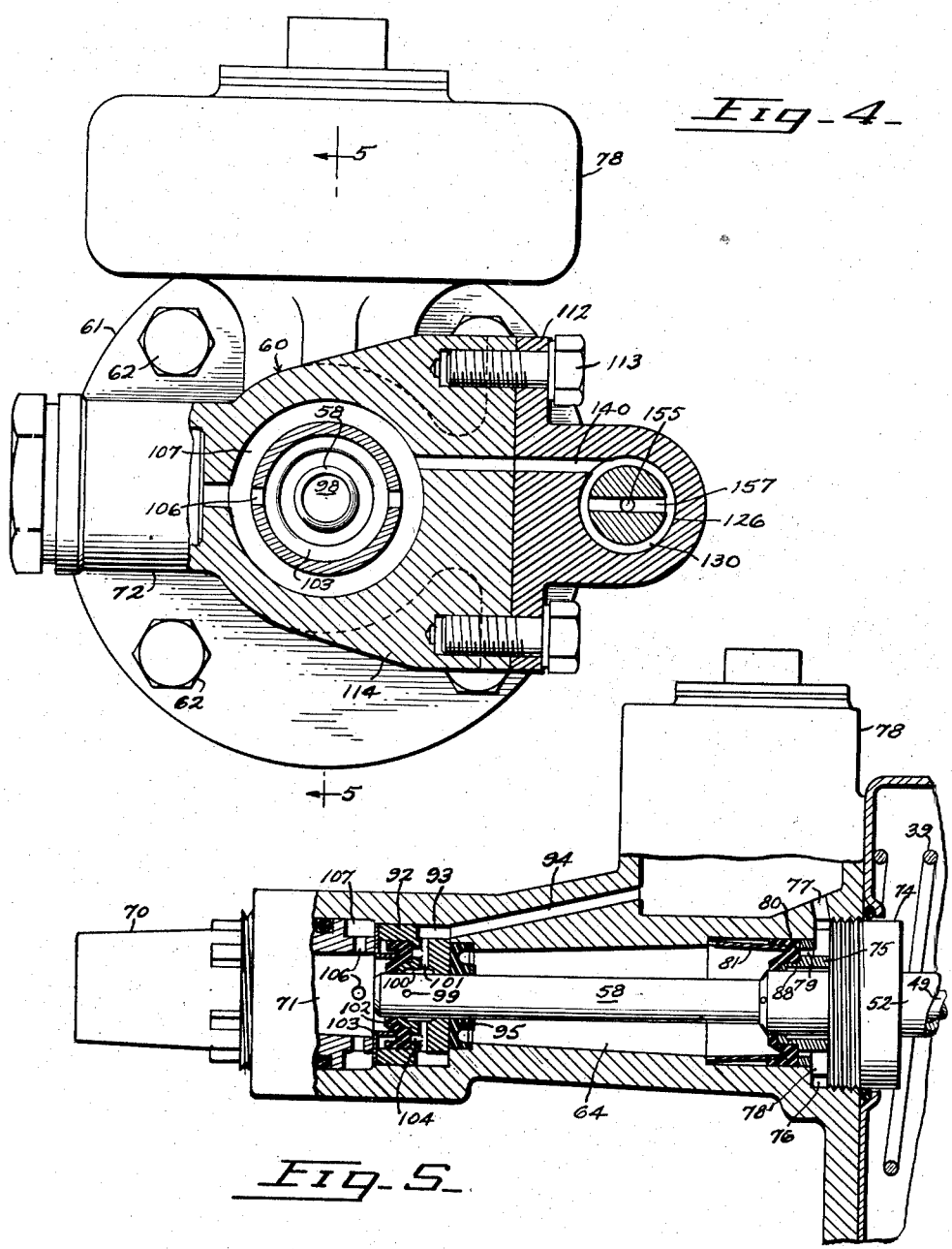
INVENTOR
EDWARD GOVAN HILL
BY John F. Philips
ATTORNEY

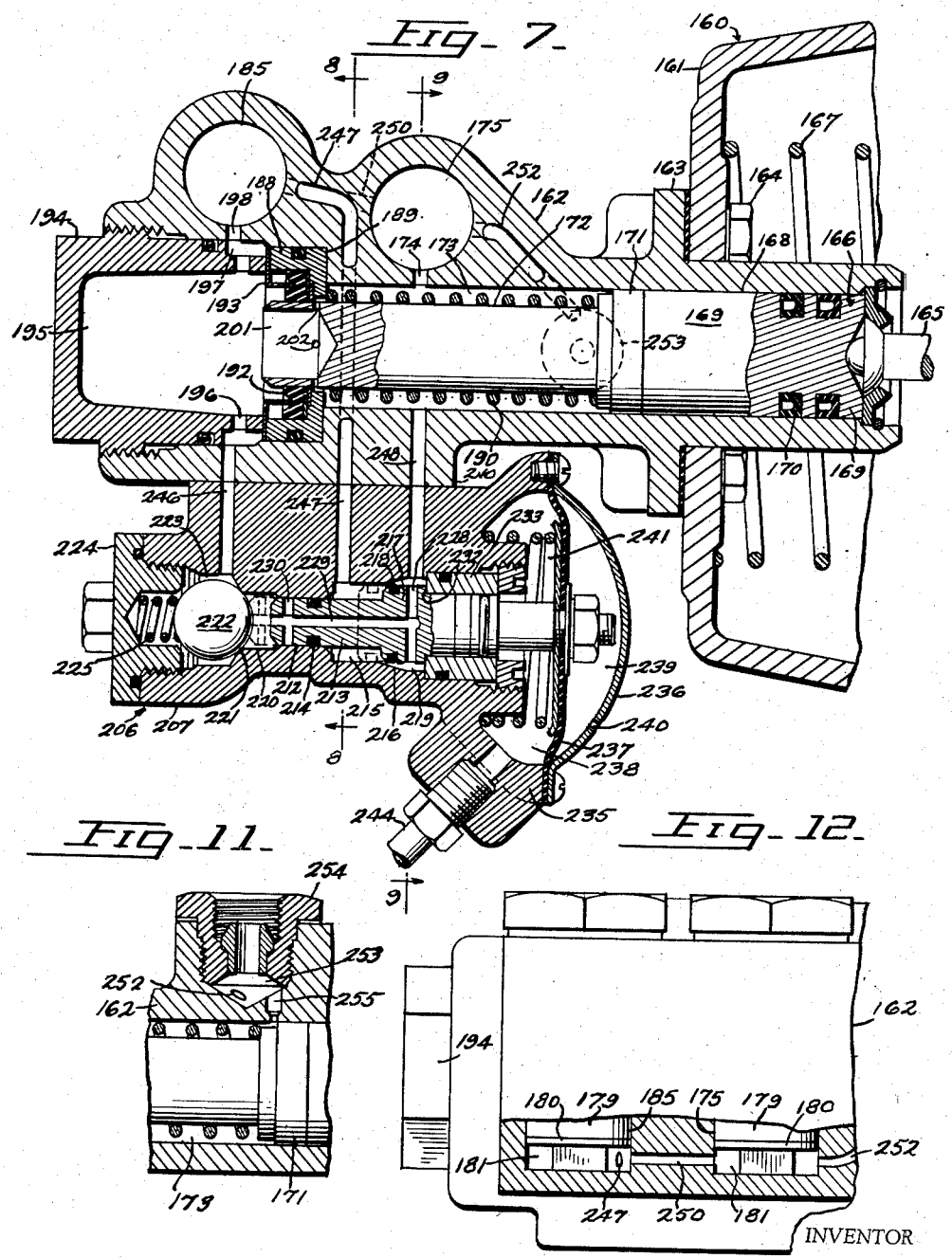

March 3, 1959  E. G. HILL  2,875,582
BOOSTER BRAKE MECHANISM
Filed Dec. 18, 1953  5 Sheets-Sheet 5

INVENTOR
EDWARD GOVAN HILL
BY John V. Philips
ATTORNEY

United States Patent Office 2,875,582
Patented Mar. 3, 1959

2,875,582
BOOSTER BRAKE MECHANISM

Edward Govan Hill, Birmingham, Mich., assignor to Kelsey-Hayes Company, a corporation of Delaware Application December 18, 1953, Serial No. 398,987

17 Claims. (Cl. 60—54.6)

This invention relates to a booster brake mechanism.

A number of types of highly practicable booster brake mechanisms have been developed and are in commercial use. It has become more and more the custom in the automotive industry to provide these mechanisms with low operating treadles, as opposed to the old type of high brake pedal, to facilitate the transferring of the foot from the accelerator pedal to the brake pedal. Such an arrangement is highly satisfactory in operation under normal conditions.

However, one of the serious problems which has been encountered in the field of booster brake mechanisms is the very substantial amount of pedal pressure necessary to apply the brakes when no power is available for the booster motor, the intake manifold of the vehicle engine commonly being employed as the source of power. For example, drivers will sometimes drift away from the curb in a motor vehicle without starting the engine, and on some occasions after an engine has been started, it will stall. Under either such condition no vacuum is present for operating the booster motor. Since law treadles are designed for normal booster brake operation, the leverage provided for foot operation of the brakes is not sufficient for a full or even a substantial application of the brakes.

An important object of the present invention is to provide a novel booster brake mechanism wherein, upon a failure of power in the booster motor, the operator is called upon to apply the brakes of only two wheels, for example, of the vehicle, thus permitting the driver to exert substantial force in applying such brakes without the necessity of having to apply all of the vehicle brakes to a much less effective extent.

A further object is to provide such an apparatus, particularly for use with four-wheel vehicles, wherein independent master cylinders are provided for the front and rear brakes respectively and wherein fluid from one master cylinder is displaced by the booster motor and fluid from the other master cylinder is displaced by a pedal-operated member, and wherein, upon a failure of power for the booster motor, the power-operated master cylinder becomes inoperative and the operator is enabled to apply effective braking force to the remaining brakes.

A further object is to provide such an apparatus having means automatically operative upon a failure of booster motor power for connecting the power-operated master cylinder to the reservoir or other point in which atmospheric pressure is present, thus rendering the power-operated master cylinder inoperative while permitting the operator manually to apply the remaining brakes.

A further object is to provide a mechanism of this character wherein, if brake operation is initiated during the power failure and then power comes on during such brake operation, the power-operated master cylinder will nevertheless remain connected to the reservoir, whereas if normal operation were restored the remaining travel of the fluid displacing members would be insufficient for displacing sufficient hydraulic fluid to effect application of all of the brakes.

A further object is to provide such an apparatus wherein, if a power failure occurs after a brake application has started, the power-operated master cylinder will be automatically immediately connected to the reservoir, thus providing for the remaining brake application with respect to the two vehicle wheel cylinders connected to the pedal-operated master cylinder.

A further object is to provide a novel control valve mechanism in combination with a booster brake mechanism of the type referred to which normally functions to connect the two master cylinders to each other to balance pressures therein, and wherein the control valve mechanism functions in the manner referred to above under conditions of a failure in power for the booster motor.

A further object is to embody the highly desirable characteristics referred to above in a control mechanism which is adapted for use with booster brake mechanisms of either of two types, namely, those having a unitary booster motor operated fluid displacing unit, assisted or unassisted by pedal pressures under normal operating conditions, and those wherein two fluid displacing members are employed, one operated by the foot pedal and the other by the booster motor.

Other objects and advantages of the invention will become apparent during the course of the following description.

In the drawings I have shown two embodiments of the invention. In this showing:

Figure 4 is a section on line 4—4 of Figure 2;

Figure 5 is a section on line 5—5 of Figure 4, parts being broken away and parts being shown in elevation;

Figure 6 is an enlarged fragmentary sectional view of a portion of the mechanism as it appears in Figure 1;

Figure 7 is a section similar to Figure 2 showing a modified form of the invention, the control valve mechanism being shown with the parts in the positions they will occupy when no booster motor power is available;

Figure 11 is a fragmentary sectional view taken on the plane indicated by the line 11—11 in Figure 9, but showing parts beyond the plane of section of such figure; and Figure 12 is a fragmentary plan view of the left-hand portion of the mechanism shown in Figure 7, parts being shown in section.

In Figures 1–6 of the drawings, the invention has been shown in conjunction with a type of booster which employs a fluid displacing member operable by the booster motor, and a second fluid displacing member operable by the brake pedal. In prior constructions of this general type, both fluid displacing members have operated in the same master cylinder, the operator performing a part of the work in applying the brakes, the proportion of work being done by the operator being represented by the ratio of the effective areas of the two fluid displacing members. In such a mechanism, the pedal or treadle is provided with direct hydraulic reaction by virtue of the displacement of hydraulic fluid by the pedal-operated fluid displacing member.

Figure 1:
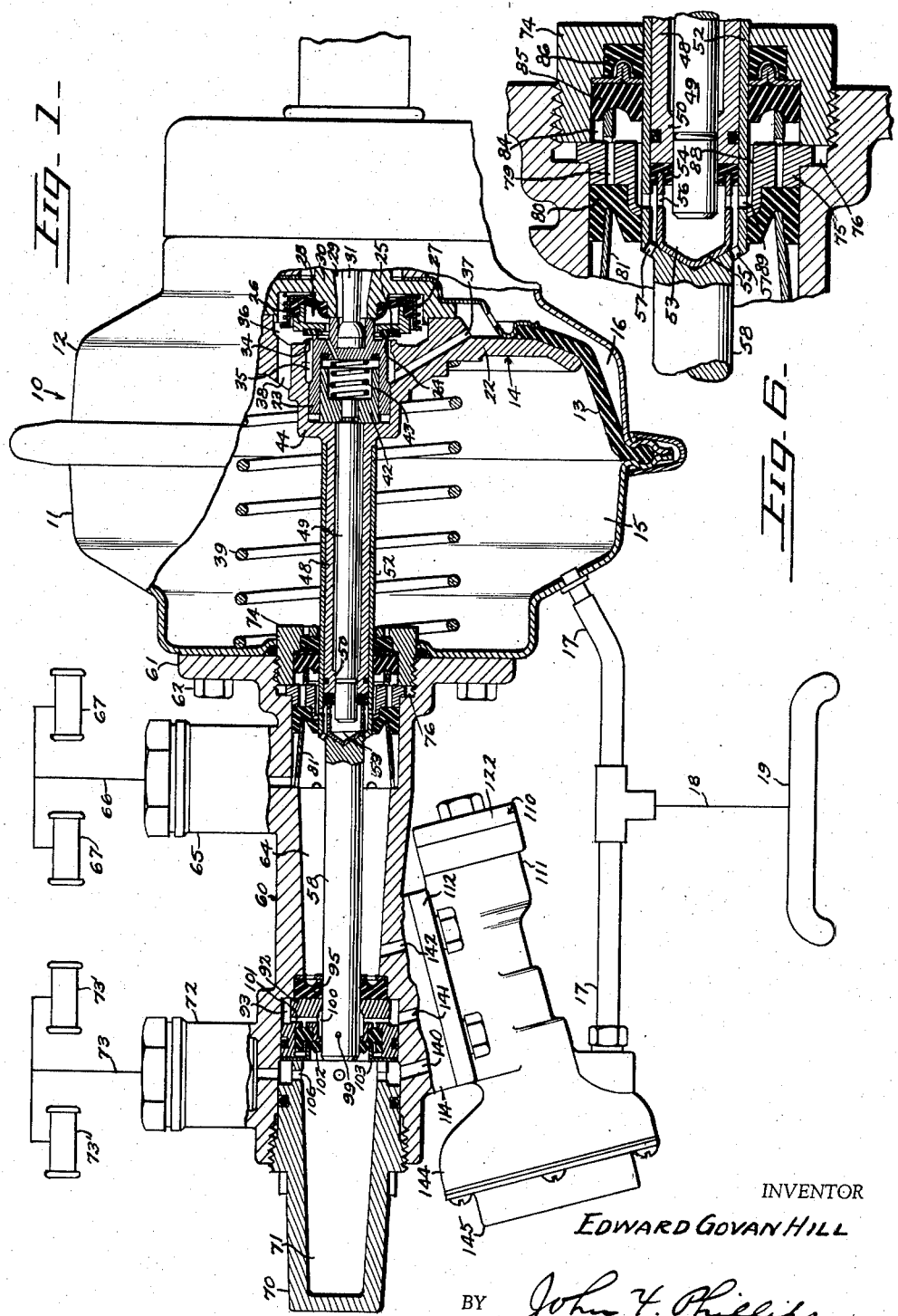
Figure 1 is a horizontal sectional view through a booster mechanism, parts being broken away and parts being shown in elevation with the wheel cylinders and engine intake manifold diagrammatically represented.

Referring particularly to Figure 1, the numeral 10 designates a booster motor comprising casing sections 11 and 12 between which is secured the peripheral portion of a diaphragm 13 forming part of a pressure responsive unit indicated as a whole by the numeral 14, which divides the motor to form a pair of chambers 15 and 16. The chamber 15 is shown in this instance as being connected to a duct 17 from which a branch 18 leads to the intake manifold 19 as a source of pressure differential. Accordingly, the chamber 15 is always subject to the vacuum conditions in the intake manifold.

The pressure responsive unit 14 comprises a body 22 in which is slidable a valve body 23 having a valve element 24 engageable with a resilient valve seat 25 carried by a structure, indicated as a whole by the numeral 26, biased to the left in Figure 1 by a spring 27. Within the structure 26 is formed a space 28 communicating with an axial opening 29 to which air is always available through means (not shown). The valve body 23 seats against the end of the body 30 in which the space 29 is formed, the bodies 22 and 30 being fixed to each other. A rod 31 is operable through the space 29 and is engageable with the valve body 23 to move the latter to the left from its normal off position, shown in Figure 1, for the operation of the brakes in the manner to be described. The rod 31 is connected to the brake pedal or treadle by any desired means (not shown).

The body 22 is provided with a valve seat 34 engageable with, but normally disengaged from, the valve seat 24, thus opening communication between an annular space 35 around the valve body 23 and an internal chamber 36 within the body 22. The space 35 communicates with the motor chamber 16 through a passage 37, while the chamber 36 is in fixed communication with the motor chamber 15 through a passage 38. With the valve mechanism in the position shown in Figure 1, therefore, the motor chambers 15 and 16 will be in communication with each other and the pressure responsive unit 14 will be vacuum suspended. Such unit is biased to its off position by the usual return spring 39.

Within the valve body 23 and axially slidable relative thereto is a head 42 seating against the adjacent portion 44 of the body 22 to limit movement of the head 42 to the left relative to the body 22. The head 42 and valve body 23 are biased for movement away from each other by a spring 43, and it will be noted that the valve 23 is capable of movement toward the left from its off position an appreciable distance before contacting with the adjacent portion 44 of the body 22. This movement of the valve body 23 is sufficient to allow the valve element 24 to move toward the left to provide for engagement of the seat 25 with the valve element 34, and further movement of the valve body 23 from such position is sufficient to disengage the valve element 24 from the seat 25, thus connecting the space 35 to the air chamber 28 for the actuation of the booster motor.

The body 22 of the pressure responsive unit is provided with a preferably integral axially extending sleeve 48 in which is arranged a rod 49 connected to the head 42. The left-hand end of the sleeve 48 (Figure 6) is formed as a bearing 50 in which the rod 49 is slidable. A preferably separate sleeve 52 is pressed on the sleeve 48 to become, in effect, an integral part thereof. Within the left-hand end of the sleeve 52 is formed a chamber 53 in which the rod 49 is movable free of the sleeve 52, as will become more apparent below. A double-lipped seal 54 is arranged between the rod 49 and sleeve 52 and is held in engagement with the adjacent end of the sleeve 48 by a keeper 55 apertured as at 56 for communication with ports 57 in the end of the sleeve 52. The sleeve 52 is provided with a preferably integral axial extension 58 in the form of a rod which forms a second hydraulic fluid displacing member as further described below.

A master cylinder body indicated as a whole by the numeral 60 is flanged as at 61 to be bolted or otherwise secured, for example as at 62, to the motor casing 11. The body 60 forms therewithin a master cylinder 64 from which hydraulic fluid is displaceable in a manner to be described through a conventional residual pressure valve 65 and thence through lines 66 to one set of wheel cylinders 67, preferably the rear wheel cylinders of a motor vehicle, for a reason to be described.

An axially extending body 70 is connected to the body 60 and forms therewithin a second master cylinder 71 from which fluid is displaceable by the rod 58 through a conventional residual pressure valve 72 from which the fluid flows through lines 73 to the other wheel cylinders of the vehicle, indicated by the numeral 73' and preferably being the front wheel cylinders.

A nut 74 is threaded into the right-hand end of the body 60, as viewed in Figures 1 and 6, and retains in position in the body 60 a bearing 75 in which the sleeve 52 is slidable. The bearing 75 forms with the body 60 an annular fluid space 76 communicating through a passage 77 (Figure 5) with any desired type of reservoir 78. The space 76 communicates through radial ports 78' with passages 79 formed in the bearing 75. Forwardly, or to the left, of the bearing 75 is arranged a double-lipped seal 80 retained in position by a keeper 81 apertured for the flow of fluid from the master cylinder 64 through residual pressure valve 65, as will be apparent in Figure 1.

The annular space 76 also communicates through ports 78' with a space 84 (Figure 6) arranged between the bearing 75 and a seal 85 arranged within the nut 74, this seal preferably being backed up by another seal 86 to insure against leakage of hydraulic fluid to the right around the sleeve 52.

The bearing 75 is internally grooved as at 88 for the flow of fluid between the space 84 and the chamber 53, the sleeve 52 being apertured as at 89 for this purpose. When the parts are in the off positions shown in Figures 1 and 6, the chamber 53 accordingly is in communication with the reservoir 78 through the various ports and passages referred to. However, upon movement of the sleeve 52 toward the left, communication will be closed between ports 89 and passages 88, and the ports 89 will be opened to communication with the master cylinder 64.

The body 70 (Figure 1) is preferably threaded into the adjacent end of the body 60 and retains in position therein a bearing 92 one end of which is reduced in size to provide an annular space 93 which communicates with the reservoir 78 through a passage 94. The bearing 92 supports the rod 58 for sliding movement, and a seal 95 is mounted between the bearing 92 and the master cylinder 64.

Figure 2:
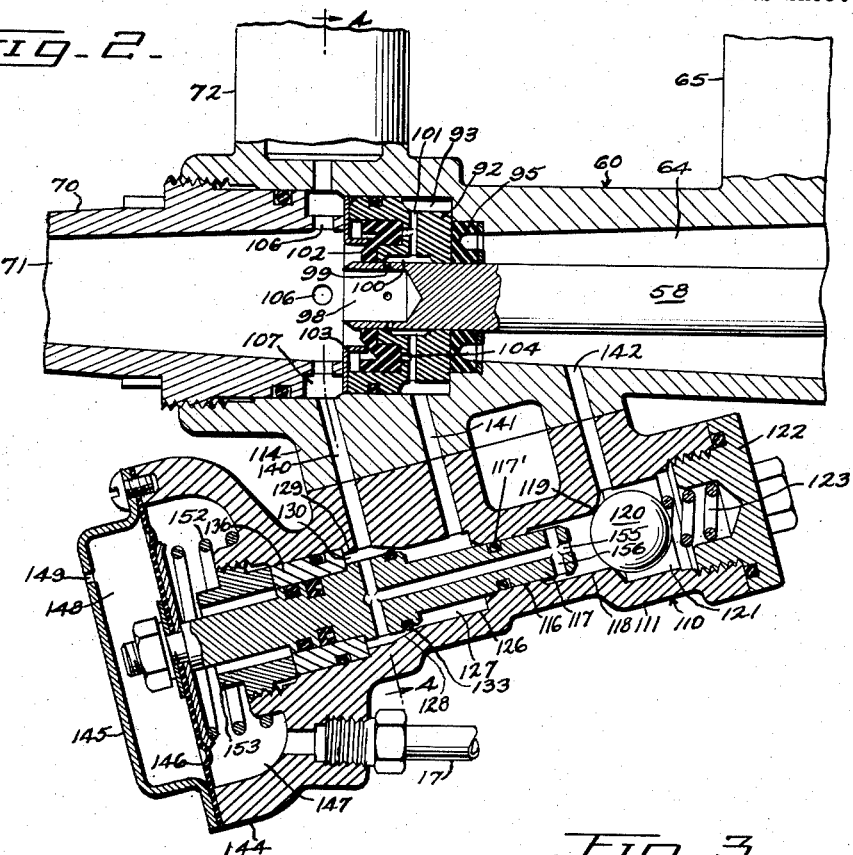
Figure 2 is an enlarged fragmentary sectional view showing the control valve mechanism in the positions occupied by the parts when no power is available for the booster motor.

Referring to Figure 2, it will be noted that the extremity of the fluid displacing rod 58 is axially recessed as at 98, and such portion of the rod 58 is apertured as at 99 for communication between the recess 98 and longitudinal grooves 100 formed in the bearing 92 and communicating with the space 93 through radial ports 101. In the off positions of the parts, therefore, the master cylinder 71 is in communication with the reservoir 78.

The left-hand end of the bearing 92 is recessed to receive a seal 102 having an inner lip in which the rod 58 is slidable, this seal being retained in position by a keeper 103. To communicate between the reservoir and the recess in which the seal 102 is arranged, the bearing 92 is ported as at 104.

As previously stated, fluid is adapted to flow from the master cylinder 71 through the residual pressure valve 72. To provide for this fluid flow, and for another purpose to be described, the body 70 is provided with ports 106 surrounded by an annular hydraulic fluid space 107.

Associated with the master cylinder body 60 is a control valve mechanism indicated as a whole by the numeral 110. This mechanism comprises a body 111 flanged at its side as at 112 (Figures 1 and 4) and attached by screws 113 to an enlargement 114 cast on the body 60.

The body 111 is provided with a plurality of bores and chambers for a purpose to be described. One of these bores, indicated by the numeral 116, slidably receives the reduced end 117 of a plunger sealed with respect to the bore 116 by an O-ring 117'. The bore 116 is relatively short and has its right-hand end enlarged as at 118 and terminating in a valve seat 119 engaged by a ball valve 120 arranged in a chamber 121 formed in the adjacent end of the body 111 and closed by a cap 122. A spring 123 is interposed between the ball 120 and cap 122 to urge the ball toward the seat 119.

To the left of the bore 116, the body 111 is provided with a larger bore 126 forming with the plunger portion 117 a chamber 127 for a purpose to be described. The wall of the bore 126 tapers toward the left to increase in diameter as at 128 and connects to a larger bore 129 forming a chamber 130. The plunger 117 is enlarged as at 132, and such enlarged plunger portion is provided with an O-ring 133 slidable into the bore 126 to disconnect chambers 127 and 130. The plunger is movable to the left to the position shown in Figure 2 under conditions to be described, in which case a shoulder 135 at the left-hand end of the plunger portion 132 engages the adjacent end of a bearing 136. In such position of the plunger, the O-ring 133 is free of the tapered surface 128, in which case the chambers 127 and 130 communicate with each other.

The bodies 60 and 111 are drilled to provide three passages 140, 141, and 142. The passage 140 communicates between the chambers 107 and 130; the passage 141 communicates between the chambers 93 and 127, and the passage 142 communicates between the master cylinder 64 and the chamber 121.

Figure 3:
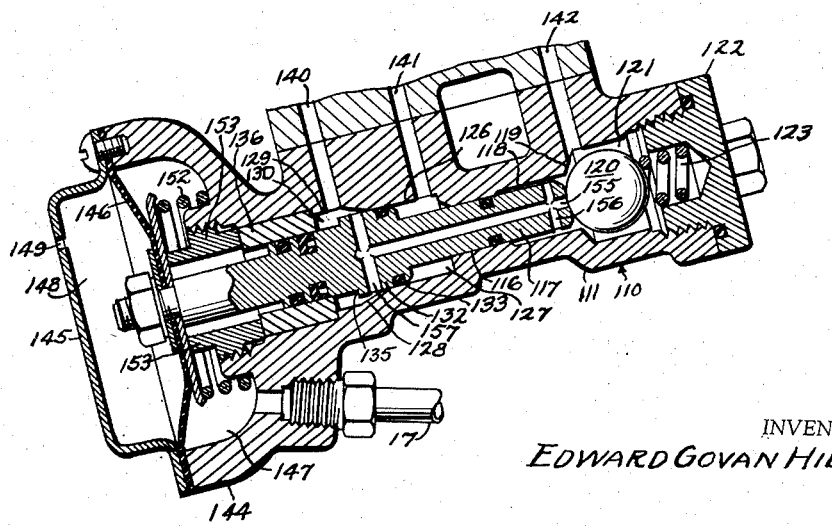
Figure 3 is a similar view of the control valve mechanism showing the parts in the positions they will occupy when booster motor power is available.

The body 111 is provided at the left-hand end, as viewed in Figures 2 and 3, with an enlarged annular end 144 covered by a cap 145, and a diaphragm 146 is clamped between the annular end 144 and cap 145 and forms a pair of pressure chambers 147 and 148, the latter of which is vented to the atmosphere as at 149. The chamber 147 communicates with the pipe 17, and accordingly vacuum is present in the chamber 147 whenever the vehicle engine is running.

A spring 152 is arranged in the chamber 147 and urges the diaphragm 146 toward the left to the position shown in Figure 2. Movement of the diaphragm toward the right to the position shown in Figure 3 is limited by a thimble 153 threaded in the body 111 and utilized to retain the bearing 136 in position.

As previously stated, the chambers 127 and 130 are in communication around the seal 133 when the plunger 117 is in the position shown in Figure 2. Thus, the passages 140 and 141 are connected to each other for a purpose to be described. At the same time, the ball valve 120 will be seated. The plunger 117 is provided with a longitudinal passage 155 having branch passages 156 adjacent the right-hand end of the plunger. The passage 155 likewise is provided with transverse passages 157 opening into the chamber 130 under all conditions. Therefore, when the plunger 117 is in the position shown in Figure 3, the chamber 130 communicates with the chamber 121, and accordingly the passages 140 and 142 are in communication.

In Figures 7–12, inclusive, a modified form of the invention has been illustrated in conjunction with that type of booster mechanism wherein the pressure responsive unit of the booster motor effects movement of a single fluid displacing unit, with or without assistance by the operator in applying force to the pedal. For example, it is now well known in the art to provide a booster motor having a pedal-actuated valve for energizing the motor and to connect the pressure responsive unit of the motor to a single fluid displacing member, with reaction on the brake pedal provided solely in accordance with energization of the booster motor. It is equally well known to provide such a mechanism wherein, after predetermined hydraulic pressure in the master cylinder has been built up, the pedal-operated valve or some other element associated therewith will engage the pressure responsive unit to assist the latter in building up braking pressures. In either case, the fluid displacing unit will be directly mechanically connected to the pressure responsive unit of the motor.

Referring to Figure 7, the numeral 160 designates a booster motor as a whole of the type referred to having casing sections one of which is indicated by the numeral 161 and shown in this instance as a casting. A master cylinder body 162, preferably in the form of a casting, is flanged as at 163 to be connected by screws 164 to the casing section 161. The pressure responsive unit (not shown) of the motor 160 is connected by a motion transmitting rod 165 to a plunger structure indicated as a whole by the numeral 166, projecting into the body 162. The usual return spring 167 for the pressure responsive unit of the motor is arranged in the casing section 161.

The body 162 is provided with a bore 168 in which slidably fits the portion 169 of the plunger 166, such portion of the plunger preferably being provided with two or more double-lipped seals 170 adjacent the right-hand end of the plunger 166 to prevent leakage around the plunger. The opposite end of the plunger portion 169 is preferably also provided with a similar seal 171. Intermediate its ends, the plunger 166 is reduced in size as at 172 to provide a smaller plunger portion spaced from the wall of the bore 168 and forming therewith a chamber 173 communicating through a port 174 with a chamber 175 forming a part of a residual pressure valve mechanism illustrated in Figure 9 and omitted in Figure 7.

Figure 9:
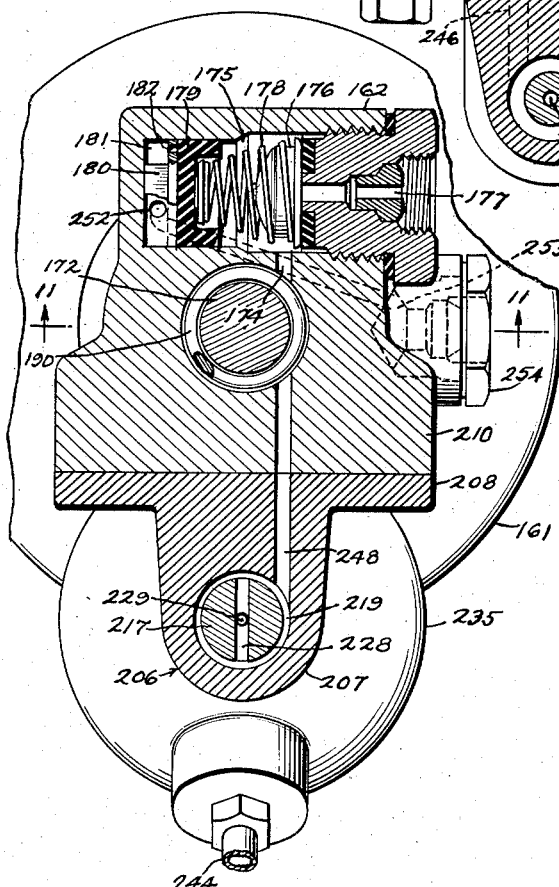
Figure 9 is a similar view on line 9—9 of Figure 7.

This valve, which is conventional in itself, is indicated by the numeral 176 and controls communication between the chamber 175 and a port 177 leading to one set of vehicle wheels, preferably the front wheels. The valve 176 is seated in one direction by a spring 178 seated in a lipped cup 179 backed up by a washer 180 around the rear portion of which is a chamber 181 (Figures 9 and 12) for a purpose to be described. Fluid under some conditions flows from the chamber 181 into the chamber 175 around the lip of the cup 179, and to facilitate such operation, the washer 180 is apertured as at 182 (Figure 9).

The body 162 is provided with a chamber 185 similar to the chamber 175 and housing therein the residual pressure valve and associated elements for the rear vehicle wheels. It will be assumed, therefore, that the same elements are associated with both chambers 175 and 185 and that the same numerals will be applicable to such elements as in Figures 9 and 10.

Figure 10:
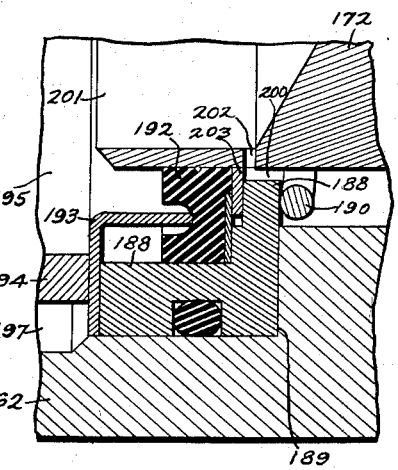
Figure 10 is an enlarged fragmentary sectional view of the extremity of the fluid displacing member and associated elements.

A ring 188 is seated against a shoulder 189 formed at the left-hand end of the bore 168 as viewed in Figures 7 and 10, and this ring forms a seat for a spring 190 arranged in the chamber 173 and urging the plunger 166 to the off position shown in Figure 7.

The plunger end 172 is slidable through a seal 192 arranged in the ring 188 and engaged by a retainer 193 fixed in position by a sleeve member 194 having a closed end and forming a chamber 195. This chamber communicates through ports 196 with an annular space 197, the latter of which in turn communicates through a port 198 with the chamber 185. Accordingly, fluid from the chamber 195 is displaceable by the plunger end 172 to flow into chamber 185 and thence into the rear wheels of the vehicle.

The opening through the ring 188 is somewhat larger than the plunger end 172 to provide a space 200, as clearly shown in Figure 10. The plunger end 172 is axially recessed as at 201, and such recess communicates through ports 202 with the space 200. To minimize leakage of fluid past the seal 192 under conditions which will become apparent, such seal is backed up by a ring 203.

It will be apparent that the chambers 173 and 195 constitute a pair of master cylinders, and associated therewith is a control valve mechanism indicated as a whole by the numeral 206. This mechanism comprises a body 207 flanged as at 208 (Figure 8) to be attached by suitable screws 209 to a pad 210 formed integral with the body 162.

The body 207 is provided with a bore 212 in which is slidable a plunger end 213 sealed with respect to the bore 212 by an O-ring 214. The plunger portion 213 projects through an enlarged bore forming a chamber 215 at the right-hand end of which in Figure 7 the bore tapers toward the right to increase in diameter as at 216, and a larger plunger portion 217 is arranged in such larger bore portion and carries an O-ring 218 movable into the bore of chamber 215 to seal the chamber 215 from a chamber 219 to the right of the tapered bore 216.

To the left of the bore 212, as viewed in Figure 7, is a slightly enlarged bore 220 terminating in a valve seat 221 engageable by a ball 222 to control communication between the chamber in the bore 220 and a chamber 223 in which the ball is arranged. The latter chamber is closed by a cap 224, and a spring 225 is arranged between this cap and the ball 222 to urge the latter to closed position.

The chamber 219 communicates with transverse ports 228 in the plunger 217 and these ports, in turn, communicate with a longitudinal plug bore 229, opening through the end of the plug portion 213 and communicating also with transverse passages 230 which, in turn, communicate with the chamber of the bore 220 when the plug is moved to the dotted line position shown in Figure 7 under conditions to be described.

Movement of the ball 222 to open position is limited by its engagement with the adjacent portions of the cap 224. Movement of the plug to the right is limited by engagement of a shoulder 232 with a bearing 233 in which the plug is slidable.

The body 207 is provided with an enlarged circular portion 235 at the right-hand end as viewed in Figure 7, and a cap 236 is fixed to the open body portion 235 with a diaphragm 237 interposed therebetween. This diaphragm forms with the body 207 and cap 236 a pair of chambers 238 and 239 the latter of which is vented to the atmosphere as at 240. The diaphragm 237 is connected to the plug referred to and is urged toward the right in Figure 7 by a spring 241.

A pipe 244 communicates with the chamber 238. This pipe corresponds to the pipe 17 described above, and is connected to a source of vacuum. Accordingly, vacuum conditions exist in the chamber 238 when the vehicle engine is running, while atmospheric pressure is always present in the chamber 239.

Figure 8:
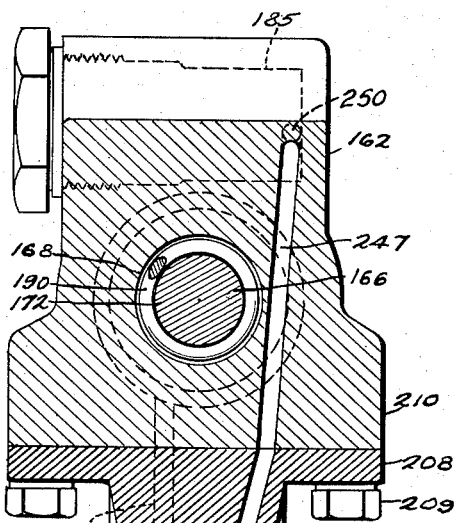
Figure 8 is a section on line 8—8 of Figure 7.

The blocks 162 and 207 are provided with passages indicated respectively by the numerals 246, 247 and 248, and these passages respectively communicate with the chambers 223, 215 and 219. As will be apparent from an examination of Figures 8 and 9, the passages 246, 247 and 248 are not in an axial plane of the piston of the master cylinders, but they have been shown principally in such plane in Figure 7 for the purpose of illustration. For example, the passage 247 is out of the plane of the master cylinder piston but has been so illustrated in dotted lines only in the portion thereof adjacent the master cylinder. As indicated in Figures 8 and 12, the upper end of the passage 247 communicates with the chamber 181 associated with the residual pressure valve chamber 185 for the rear wheels. The passage 246 communicates between the chamber 223 and the master cylinder 195, while the passage 248 directly communicates between the chamber 219 and the master cylinder 173.

Referring to Figure 12, it will be noted that the body 162 is provided with a passage 250 communicating between the two chambers 181. Therefore these chambers not only are in fixed communication with each other but also in fixed communication with the chamber 215 of the control valve mechanism.

As previously stated, the passage 247 communicates with one of the chambers 181. The other of these chambers (Figures 7, 9, and 12) communicates with a passage 252. The other end of this passage terminates in a chamber 253 (Figure 11) formed in the body 162 and a fitting 154 is carried by the body 162 to connect the chamber with a pipe, not shown, leading to a suitable hydraulic fluid reservoir. The body 162 is provided with a port 255 connecting the chamber 253 to the master cylinder 173 just ahead of the cup 171 when the parts are in the off position shown.

*Operation*

In the form of the invention shown in Figures 1–6, inclusive, there has been illustrated a booster motor of the type wherein a foot-operated plunger cooperates with a power-operated plunger sleeve whereby the operator performs part of the work in applying the brakes. The particular type of motor employed makes no difference so far as the present invention is concerned, and solely for the purpose of illustration, the motor in Figure 1 is of the type shown in the copending application of Jeannot G. Ingres and David T. Ayers, Jr., Serial No. 318,496, filed November 3, 1952.

The parts normally occupy the off positions shown in Figure 1, and the parts of the auxiliary valve mechanism occupy the positions shown in Figure 3 when the vehicle engine is running and vacuum is available for the motor 10. The operation will be first described assuming such conditions to be present. Referring to Figure 3, it will be noted that the seal 133 will be arranged in the bore 126, thus closing communication between chambers 130 and 127. The ball 120 being unseated, the chamber 121 will communicate through passages 155, 156 and 157 with the chamber 130, thus connecting passages 140 and 142, which open respectively into the master cylinders 71 and 64. Accordingly, whenever vacuum is present in the system, the master cylinders will always be in communication with each other.

When the brake is to be applied, the operator will depress the brake treadle (not shown) to move the rod 31 (Figure 1) to the left. This initial movement takes place solely against the resistance of the spring 43, which is stronger than the spring 27. Accordingly, the valve body 23 will be moved to the left and the spring 27 will cause the valve element 25 to remain in engagement with the valve seat 24 until the valve element 25 engages the seat 34. This will be the lap position of the valve parts. Further movement of the rod 31 toward the left will disengage the valve seat 24 from the valve 25 while the latter element remains in engagement with valve seat 34. Thus the chamber 36 will have been disconnected from the chamber 35 and hence from the motor chamber 16, and the space 35 will now be connected to the space 28 in which atmospheric pressure is always present.

Thus air will be supplied to the motor chamber 16 and the pressure responsive unit 14 will move to the left to impart movement to sleeves 48 and 52 and to the fluid displacing rod 58. Assuming that movement of the rod 31 toward the left in Figure 1 is continued, the spring 43 will exert a force maintaining the head 42 in engagement with the portion 44 of the pressure responsive unit and, accordingly, the rod 49 will move with the pressure responsive unit until sufficient fluid is displaced from the master cylinders 64 and 71, as further referred to below, to initially engage the brake shoes with the drums. Increased hydraulic pressure in the chamber 64 will react through chamber 53 (Figure 6) against the end of the rod 49 to take up play between the head 42 and valve body 23, whereupon the operator will feel through the brake treadle the actual hydraulic reaction pressures in the master cylinder 64.

This operation continues until a predetermined pressure is built up in the master cylinders beyond which the pressure cannot be increased by energization of the motor. After this point is reached, the valve body 23 will be moved to the left in solid engagement with the portion 44 of the pressure responsive unit, and the operator's foot pressure will then assist the motor in the generation of maximum braking pressures in the brake system.

It will be obvious that pressures will be balanced in the master cylinders 64 and 71 since they are in communication with each other through passages 140 and 142 (Figures 2 and 3) as stated above. Movement of the rod 58 into the master cylinder 71 obviously displaces fluid therefrom. The rod 49, in cooperation with the surface at the right-hand end of the rod 58, representing the difference in the diameter of the rod 58 and sleeve 52, reduces the capacity of the master cylinder 64 to displace fluid therefrom. The relative areas of the various fluid displacing elements may be so designed as to displace fluid equally from the two master cylinders, although it will be obvious that more fluid may be displaced from one master cylinder than the other. Preferably, in many installations, displacement from the chamber 64 will be less than from the chamber 71 for a purpose to be described.

Retractile movement of the parts when the brake treadle is released will be apparent. The spring 43 (Figure 1) urges the valve body 23 to the right to engage valve seat 24 with the valve element 25 to move it to the position shown in Figure 1 disengaged from the valve seat 34. The chamber 36 will again communicate with the motor chamber 16 through annular space 35 and passage 37, and since the chamber 36 is always in communication with the motor chamber 15, air will be evacuated from the motor chamber 16 and the motor will be vacuum suspended. With pressures thus balanced in the motor, the return spring 39 will move the pressure responsive unit 14 back to its off position and the parts will re-assume the positions shown in Figure 1.

It should be borne in mind that the foregoing operations have been described on the assumption that the vehicle engine is running and vacuum is present in motor chamber 15 and hence in the chamber 147 of the control valve mechanism. Under such conditions, atmospheric pressure in the chamber 148 will have held the valve plunger 117 in the position shown in Figure 3.

Assuming that a driver of a motor vehicle drifts away from the curb or the vehicle engine stalls, no vacuum will be available and atmospheric pressure will be present in the motor chamber 15 and in the vacuum chamber 147 (Figures 2 and 3). Under such conditions, the spring 152 will move the valve plunger 117 to the position shown in Figure 2. Under such conditions, the spring 123 will seat the ball valve 120 and cut off communication between chambers 121 and 130. The master cylinders 64 and 71 therefore will be disconnected from each other. The seal 133 will be moved out of the bore 126 and will clear the tapered surface 128, thus connecting chambers 127 and 130, as shown in Figure 2. The master cylinder 71 will now communicate with the reservoir 78 through passage 140, chambers 130 and 127, passage 141, annular space 93 (Figures 2 and 5), and thence through passage 94. Atmospheric pressure then will be established in the master cylinder 71.

If the operator now depresses the brake treadle, operation of the valve mechanism in Figure 1 cannot energize the motor, and the valve body 23 will move into solid engagement with the portion 44 of the pressure responsive unit, and the rod 49, sleeves 48 and 52, and rod 58 will be manually actuated. Inasmuch as the master cylinder 71 now communicates with the reservoir, hydraulic fluid in the master cylinder 71 will follow the path of least resistance and instead of flowing to the wheel cylinders 73', will flow freely into the reservoir 78. The rod 58 accordingly becomes inoperative for generating any braking force.

However, the fluid displacing means for the master cylinder 64 will displace fluid therefrom, and since the ball valve 120 will be closed as in Figure 2, fluid will be displaced into the brake cylinders 67 to apply the brakes associated therewith.

Difficulty has been encountered with prior constructions when no power is available for the booster motor due to the very great force which must be applied to a low brake treadle, it being impossible with the low leverage ratio of such treadle to generate sufficiently effective braking pressures. With the present construction, effective braking pressures can be developed by manual displacement of fluid from the master cylinder 64 to operate the brakes associated with the wheel cylinders 67, and the braking pressure developed in the master cylinder 64 is very substantially greater than can be developed by foot pressure with other constructions. Thus the present apparatus provides means whereby a motor vehicle can be stopped in a reasonable distance by pedal pressure when no power is available for the booster motor.

As is well known, wearing of the front brake linings takes place more rapidly than is true of the rear brake linings due to the very substantial weight carried by the front end of the vehicle. Therefore more brake fluid usually must be displaced into the front cylinders than into the rear brake cylinders to initially engage the linings with the drums. This makes no difference in the normal operation of the apparatus when vacuum is present for the motor 10. The displacement of fluid from both master cylinders is ample for engaging the linings with the drums, and communication between the two master cylinders, as in Figure 3, renders substantially greater fluid available for the front wheel cylinders if necessary.

Substantially greater fluid is required for the front wheel cylinders after substantial wear of the brake linings has taken place. It is therefore preferred that the manual application of the brakes, when no power is available, takes place with respect to the rear wheel cylinders in view of the limited fluid displacement required. Therefore, the wheel cylinders 67 are preferably the rear wheel cylinders. If the areas effective for displacing fluid from the master cylinder 64 are smaller than the area of the rod 58, it will be apparent that when no power is available, the smaller areas operating in the master cylinder 64 will displace sufficient fluid while at the same time providing higher line pressures when no power is available for the motor 10 than is true under normal operating conditions.

It is important that the apparatus function to effect movement of the valve plunger 117 from the position shown in Figure 3 to the position shown in Figure 2 in the event of a power failure during brake application. The present apparatus provides for such result. Assuming that the parts are positioned as in Figure 3 and after a brake application is started there is a failure in the source of vacuum, atmospheric pressure will quickly occur in the chamber 147. The pressure previously built up in the master cylinder 71 will act to the right against the shoulder 135, and the area of this shoulder is approximately equal to the area of the plunger portion 117 acted upon by pressure in the master cylinder 64. Therefore the plunger is free to float and the spring 152, initially assisted by the spring 123, will immediately move the valve plunger 117 toward the left. The ball 120 will seat, and the spring 152 will move the valve plunger 117 to the position shown in Figure 2.

During the remainder of the brake application, therefore, the master cylinder 71 will be inoperative and the rear wheel cylinders 67 will be actuated by pedal pressure. Thus a failure of power during a brake application renders the device immediately operative and prevents the necessity of the operator's having to manually effect application of all of the brakes.

On the other hand, it is important that movement of the valve from the position in Figure 2 to the position in Figure 3 be prevented if brake application is initiated with no power available and the power comes on during the brake application. This is important for the reason that if brake operation is initiated without power, the master cylinder 71 will be connected to the reservoir as described above, and movement of the plunger 58 will have displaced fluid from the master cylinder 71, not into the brake lines 73, but back to the reservoir. If, under such conditions, the change-over in the position of the valve plunger 117 is permitted, there will be insufficient fluid in the two master cylinders to complete the application of the brakes.

Assuming the parts to be in the positions shown in Figure 2 with no power available, and assuming that power becomes available after a brake application has been started, the motor will tend to develop pressure in the master cylinder 71 and this pressure will act through passage 140 and through the passages of the plunger 117 to tend to unseat the ball 120. A second force will be applied to this ball by the creation of differential pressures at opposite sides of the diaphragm 146. However, substantial hydraulic pressure will have been built up in the master cylinder 64, and this pressure, acting on the ball 120 to tend to hold it on its seat, will exceed the sum of the two forces tending to unseat the ball valve. This valve accordingly will remain closed during the rest of the brake application regardless of the energization of the motor 10.

The operation of the form of the invention shown in Figures 7–12, inclusive, is essentially the same as in the form described above. The fluid displacing means shown in Figure 7 is used with that type of booster wheerin no pedal-operated plunger, such as the plunger 49, is used. A unitary fluid displacing means is employed and is actuated by the pressure responsive unit of the booster motor, regardless of whether such unit is assisted by pedal pressure during brake application. It is essential, however, that there be mechanical connection between the foot pedal and the fluid displacing unit to effect manual application of the brakes in the event of a failure of power in the booster motor.

Except for a reversal of the position of the parts, the control valve mechanism in Figure 7 is the same as that described above. In this case, however, the master cylinder 195 preferably will be connected through its residual pressure valve to the rear wheel cylinders, while the master cylinder 173 will be connected to the front wheel cylinders. The plunger 172 is the fluid displacing element for the master cylinder 195 while the plunger 166, minus the area of the plunger 172, will be effective for displacing fluid from the master cylinder 173.

Assuming that vacuum is present for the motor 160, the control valve plunger 213 will be moved to the dotted line position, unseating the ball 222 and closing communication between the chambers 215 and 219. The two master cylinders will now be in communication through passages 246 and 248 and the passages in the control valve plunger. When the brakes are operated, therefore, both fluid displacing elements will be operative for displacing fluid into the wheel cylinders, since no fluid can flow from either master cylinder into the return passage 247 leading to the reservoir. Fluid displaced from the master cylinders under such normal operating conditions will flow through ports 174 and 198 (Figure 7) to be discharged through the conventional residual pressure valves, one of which is shown in Figure 9, and thus will flow into the wheel cylinders. Retractile movement of the parts takes place in the same manner as described above.

It will be apparent that so long as the source of vacuum is available, the control valve plunger will remain in the dotted line position in Figure 7. When no power is available, this plunger will occupy the solid line position in Figure 7. The ball 222 will be seated and the passage 248 from the master cylinder 173 will communicate through chambers 219 and 215 with the passage 247. This passage leads into the space 181 (Figure 12) associated with one of the residual pressure valves. The chamber 181 referred to communicates through passage 250 with the other chamber 181, thence through passage 252 to the chamber 253 (Figures 9 and 11) to be discharged back into the reservoir. Thus the single master cylinder 195 will be operative for the manual application of the brakes.

The modified form of the invention obviously functions in exactly the same manner as described above for preventing restoration of the control valve plunger to the dotted line position shown in Figure 7 if a brake application is started without power and power becomes available during such brake application. Pressures in the master cylinder 195 will retain the ball 222 seated under such conditions.

In a manner similar to the operation described above, a change-over in the position of the control valve plunger will occur if power fails during a brake application. Under such conditions, the spring 241 will move the control valve plunger to the solid line position and the ball 222 will seat, thus permitting the completion of a brake application by foot pressure on the pedal.

In the form of the invention shown in Figures 1–6, inclusive, fluid is directly supplied from the reservoir to the master cylinders if sub-atmospheric pressure occurs therein during a retractile movement of the parts. From an examination of Figures 5 and 6 it will be apparent that the reservoir communicates through passages 78' with annular space 76 and with the chamber 84 from which fluid may flow through ports 79 and over the inner lip of seal 80 into master cylinder 64. From chamber 84 fluid will find its way into the master cylinder 64, when the parts are in off position, through ports 89 and 57.

Referring to Figures 2 and 5, the reservoir passage 94 supplies fluid to the chamber 93, thence through passage 101 and ports 99 into the master cylinder 71, when the parts are in off position. If sub-atmospheric pressure occurs in the master cylinder 71 during return movement, fluid from the reservoir can flow through passages 101 and 100 and thence over the inner lip of the cup 102 into the master cylinder 71.

In the form of the invention shown in Figures 7-12, inclusive, it will be apparent that the reservoir, connected to the fitting 254 (Figure 11) is always in communication through passages 252 and 250 with the chambers 181 (Figures 9 and 12). Whenever sub-atmospheric pressure occurs in the master cylinders 173 and 195, hydraulic fluid under atmospheric pressure in either or both of the chambers 181 will flow through ports 182 (Figure 9) and past the lips of the cups 179 from which it is free to flow into the associated master cylinders. Thus the creation of substantial partial vacuum in the master cylinders is prevented.

It is to be understood that the forms of the invention illustrated and described are for the purpose of illustration and that the scope of the invention is defined in the appended claims.

I claim:

1. A booster brake mechanism for a motor vehicle having a plurality of wheel cylinders, comprising a pair of master cylinders, a fluid displacing unit comprising portions movable into the respective master cylinders to displace fluid therefrom, one of said master cylinders being connected to certain of said wheel cylinders and the other master cylinder bein connected to the remaining wheel cylinders, a fluid motor connected to said displacing unit, a power source for said motor, control means connected to said motor and said source, pedal-operable means for operating said control means and connected to said fluid displacing unit for transmitting brake pedal forces for effecting movement of said fluid displacing unit upon a failure of power in said source, and valve means connected to said master cylinders and said power source including portions subject to pressure from said power source to permit fluid to be displaced from both master cylinders to their respective wheel cylinders and operative during failure of said power source to permit fluid to be displaced from only said one master cylinder to its respective wheel cylinders.

2. Apparatus constructed in accordance with claim 1 including a fluid reservoir connected to said master cylinders and said valve means, said power source for opening said other master cylinder to communication with said reservoir.

3. Apparatus constructed in accordance with claim 2 in which said control portions of said valve means comprise a valve device biased to a position connecting said other master cylinder to said reservoir, and pressure-responsive means connected to said valve device and subject to power in said source for moving said valve device to a second position to disconnect said other master cylinder from said reservoir.

4. Apparatus constructed in accordance with claim 3 in which each of said master cylinders has a fluid passage communicating therewith and with portions of said valve device whereby said valve device in the second position connects said passages of said master cylinders with each other to balance pressures therein.

5. A booster brake mechanism for a motor vehicle having a plurality of wheel cylinders, a pair of master cylinders one of which is connected to certain of said wheel cylinders and the other of which is connected to the remaining wheel cylinders, a fluid displacing unit comprising a pair of members movable into the respective master cylinders to displace fluid therefrom, a motor connected to said fluid displacing unit, a power source for said motor, control means connected to said motor and said source, a brake pedal, means connected to said brake pedal and fluid displacing unit for transmitting brake pedal forces to said fluid displacing unit, a reservoir, and valve means connected to said master cylinders and said power source including portions subject to pressure from said power source to permit fluid to be displaced from both master cylinders to their respective wheel cylinders and operative during failure of said power source to permit fluid to be displaced from only said one master cylinder to its respective wheel cylinders, said valve means comprising a valve device biased to a position connecting said other master cylinder to said reservoir, and control means connected to said valve device and subject to power in said source to move said valve device to a second position disconnecting said other master cylinder from said reservoir.

6. Apparatus constructed in accordance with claim 5 wherein said motor is a fluid motor and said source is a fluid pressure source, said control means comprising a casing having a diaphragm therein connected to said valve device and dividing said casing to form a pair of chambers one of which is open to the atmosphere and the other of which is connected to said source.

7. Apparatus constructed in accordance with claim 5 wherein each of said master cylinders is provided with a passage, said valve device, when in said second position, including portions connecting said passages to balance pressures in said master cylinders.

8. A booster brake mechanism for a motor vehicle having a plurality of wheel cylinders, a pair of master cylinders one of which is connected to certain of said wheel cylinders and the other of which is connected to the remaining wheel cylinders, a fluid displacing unit comprising a pair of members movable into the respective master cylinders to displace fluid therefrom, a motor connected to said fluid displacing unit, a power source for said motor, valve means connected to said motor and said source, a brake pedal, means connected to said fluid displacing unit and brake pedal for transmitting power and brake pedal forces to said unit, a reservoir, and a control valve mechanism comprising a body having a first chamber connected to said one master cylinder, a second chamber connected to said other master cylinder and a third chamber connected to said reservoir, said mechanism including a valve device in said valve body biased to a position opening said second and third chambers to each other and preventing communication of said master cylinders with said reservoir through said first chamber, and means connected to said valve body and subject to power in said source for moving said valve device to a second position disconnecting said second chamber from said third chamber and connecting said first and second chambers to each other.

9. Apparatus constructed in accordance with claim 8 wherein said motor is a fluid motor and said source is a fluid pressure source, said means for moving said valve device to its second named position comprising a pressure responsive device connected to said valve device and having a chamber communicating with said source.

10. Apparatus constructed in accordance with claim 8 wherein said valve device comprises a ball valve biased to a closed position to close said first chamber, and a plunger valve biased to a position connecting said second and third chambers and operable by power in said source to be moved to a second position closing communication between said second and third chambers and engageable with said ball valve to unseat it to connect said first and third chambers to each other.

11. Apparatus constructed in accordance with claim 8 wherein said motor is a fluid motor and said source is a pressure source, said means for moving said valve device to its second position comprising a casing, and a diaphragm therein connected to said valve device and dividing said casing into a pair of chambers one of which communicates with the atmosphere and the other of which communicates with said source.

12. A booster brake mechanism for a motor vehicle having a plurality of wheel cylinders, comprising a pair of master cylinders one of which is connected to certain of said wheel cylinders and the other of which is connected to the remaining wheel cylinders, a unitary fluid displacing device having portions operable in the respective master cylinders to displace fluid therefrom, a fluid motor, a source of fluid pressure, valve means connected to said motor and said source, a brake pedal, means connected to said brake pedal and said fluid displacing device for transmitting to said fluid displacing device power from said motor and brake pedal-generated forces to simultaneously displace fluid from both master cylinders into the wheel cylinders to which they are connected, and valve means connected to said master cylinders and said power source including portions subject to pressure from said power source to permit fluid to be displaced from both master cylinders to their respective wheel cylinders and operative during failure of said power source to permit fluid to be displaced from only said one master cylinder to its respective wheel cylinders.

13. Apparatus constructed in accordance with claim 12 including a reservoir connected to said valve means, said valve means including a valve device biased to a first position connecting said other master cylinder to said reservoir, said valve means including means connected to said valve device and subject to pressure from said source and including portions for moving said valve device to a second position disconnecting said other master cylinder from said reservoir and connecting said cylinders to each other to balance the pressures therein.

14. A booster brake mechanism for a motor vehicle having a plurality of wheel cylinders, a pair of master cylinders in axial alignment each connected to certain of said wheel cylinders, a first fluid displacing member for displacing fluid from one master cylinder, a second fluid displacing member movable into the other master cylinder to displace fluid therefrom, a fluid motor comprising a sleeve projecting into said one master cylinder and forming a part of said second fluid displacing member, said second fluid displacing member having a chamber communicating with said first master cylinder and in which said first fluid displacing member is movable to reduce the capacity of such chamber, a source of fluid pressure, valve means connected to said motor and said source, a reservoir, and valve means connected to said master cylinders, said power source and said reservoir, said valve means including a valve device biased to a position connecting said other master cylinder to said reservoir, said valve means including means connected to said valve device and subject to power in said source for moving said valve device to a second position disconnecting said other master cylinder from said reservoir.

15. Apparatus constructed in accordance with claim 14 wherein said means connected to said valve device comprises a pressure responsive device connected to said valve device and having fluid connection with said source.

16. A booster brake mechanism for a motor vehicle having a plurality of wheel cylinders, a pair of master cylinders in axial alignment each connected to certain of said wheel cylinders, a first fluid displacing member for displacing fluid from one master cylinder, a second fluid displacing member operable in the other master cylinder for displacing fluid therefrom, a fluid motor comprising a sleeve projecting into said one master cylinder and forming a part of said second fluid displacing member, said second fluid displacing member having a chamber communicating with said first master cylinder and in which said first fluid displacing member is movable to reduce the capacity of such chamber, a source of fluid pressure, valve means connected to said motor and said source, a reservoir, and value means connected to said master cylinders, said power source and said reservoir, said valve means comprising a valve body having a first chamber communicating with said one master cylinder, a second chamber communicating with said other master cylinder and a third chamber communicating with said reservoir, biasing means connected to said valve device uring it to a position closing said first chamber and opening said second and third chambers for communication with each other, and means connected to said valve device and subject to power in said source for closing said second chamber to communication with said third chamber and opening said first and second chambers to communication with each other.

17. A booster brake mechanism for a motor vehicle having a plurality of wheel cylinders, a pair of master cylinders in axial alignment each connected to certain of said wheel cylinders, a first fluid displacing member for displacing fluid from one master cylinder, a second fluid displacing member operable in the other master cylinder for displacing fluid therefrom, a fluid motor comprising a sleeve projecting into said one master cylinder and forming a part of said second fluid displacing member, said second fluid displacing member having a chamber communicating with said first master cylinder and in which said first fluid displacing member is movable to reduce the capacity of such chamber, a reservoir, a source of pressure, valve means connected to said motor and said source, and valve means connected to said master cylinders, said power source and said reservoir, said control valve means comprising a valve body having a first chamber communicating with said one master cylinder, a second chamber communicating with said other master cylinder and a third chamber communicating with said reservoir, said first chamber having a valve seat, a ball valve biased into engagement with said seat, a plunger valve biased to a position away from said ball valve and operative in such position to open communication between said second and third chambers, and means connected to said plunger valve and responsive to pressure in said source for moving said plunger valve to a second position closing communication between said second and third chambers and engaging and unseating said ball valve to conect said first and third chambers to each other.

References Cited in the file of this patent
UNITED STATES PATENTS

| | | |
|---|---|---|
| 2,343,698 | Parnell | Mar. 7, 1944 |
| 2,373,272 | Stelzer | Apr. 10, 1945 |
| 2,402,344 | Price | June 18, 1946 |
| 2,472,695 | Chouings | June 7, 1949 |